United States Patent [19]

Hoecht

[11] Patent Number: 5,018,407
[45] Date of Patent: May 28, 1991

[54] PEDESTAL ASSEMBLY HAVING A REDUCED VOLUME IN A LUBRICANT FILLED HOUSING

[75] Inventor: Dietrich H. Hoecht, Loganville, Ga.

[73] Assignee: Scientific-Atlanta, Inc., Atlanta, Ga.

[21] Appl. No.: 429,283

[22] Filed: Oct. 27, 1989

[51] Int. Cl.⁵ .................. F16H 57/04; F16H 57/02
[52] U.S. Cl. .................. 74/606 R; 74/467; 184/6.12; 184/109
[58] Field of Search .............. 74/467, 606 R; 184/6.12, 103.1, 109

[56] References Cited

U.S. PATENT DOCUMENTS 4,420,990 12/1983 Hauser ...................... 184/6.12 X
4,909,203 3/1990 Fukuo ....................... 184/6.5 X

FOREIGN PATENT DOCUMENTS 2180603 4/1986 United Kingdom .......... 74/467

OTHER PUBLICATIONS

Christian, Supergrease Replaces Oil as a Transmission Lubricant, Machine Design, Jun. 1975.
Scientific-Atlanta Drawing No. 192002, 1978.
Scientific-Atlanta Drawing No. 191061, 1978.

Primary Examiner—Allan D. Herrmann
Attorney, Agent, or Firm—Jones, Askew & Lunsford

[57] ABSTRACT

A lubricant filled drive assembly is disclosed having an insert to displace a portion of the required volume of lubricant. The insert is shaped so as to receive interchangeable or optional pieces of drive assembly equipment, and when certain pieces of equipment are not used, plugs are added to the assembly to occupy the empty space within the insert. By eliminating any unoccupied space, the plugs alleviate the need for additional lubricant which might otherwise be a cost of adding flexibility to the gear drive. The insert and plugs are preferably coated with a lubricant impermeable layer.

11 Claims, 6 Drawing Sheets

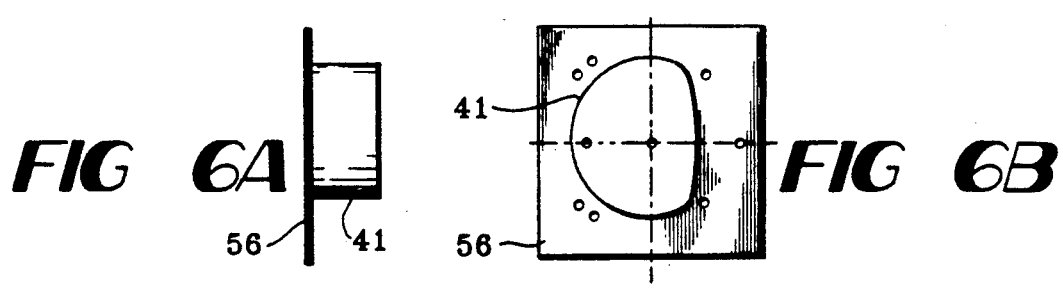
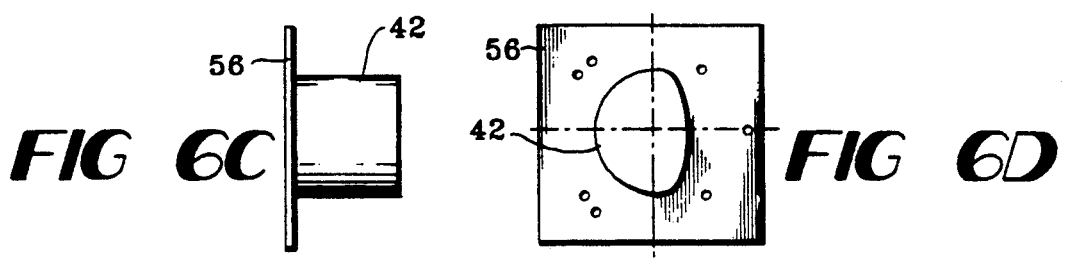
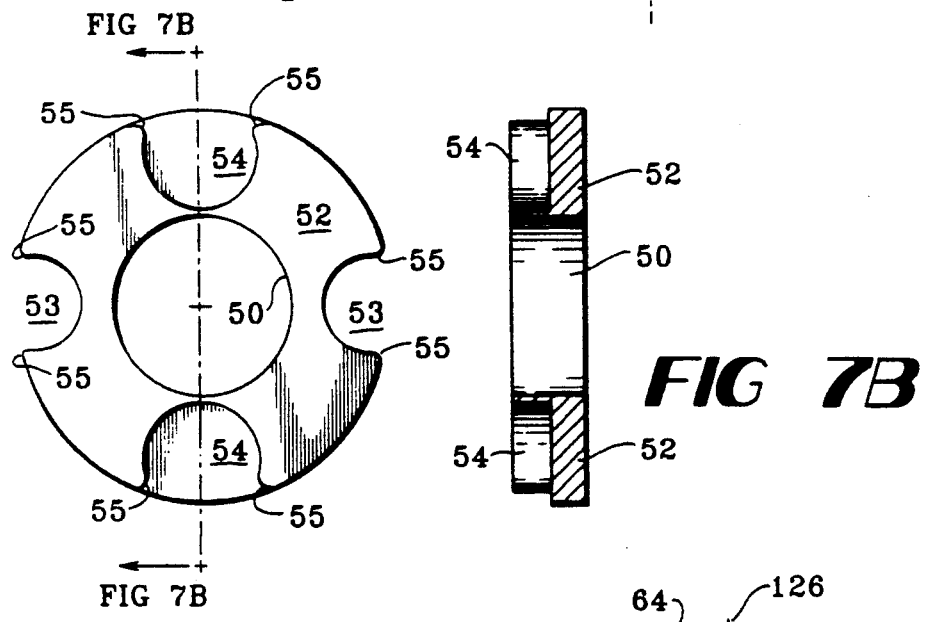
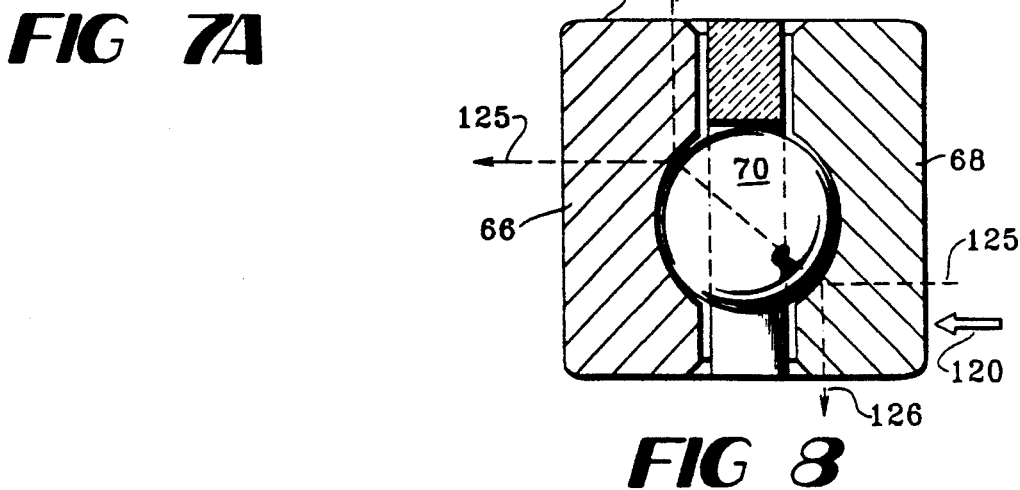

PEDESTAL ASSEMBLY HAVING A REDUCED VOLUME IN A LUBRICANT FILLED HOUSING

TECHNICAL FIELD

The present invention relates to a lubricant filled modular drive assembly for use in mounting antenna reflectors. More particularly, the invention relates to interchangeable pieces added to the assembly housing so as to displace the volume of lubricant.

BACKGROUND

In the satellite communications and telemetry field it is desirable to have tracking antennas that are inexpensive to construct and that are virtually maintenance free. To permit changes in its orientation, an antenna reflector must be able to pivot about one or more axes, depending on the type of mounting used.

One type of mounting structure is the elevation over azimuth type in which structures must provided for independent rotation about the horizontal or elevation axis and also about the vertical or azimuth axis. Previous structures have utilized different drive assemblies to provide the rotational power to achieve the proper elevation and azimuth orientations. Such drive assemblies are more expensive to design, manufacture and maintain. Therefore, there has existed a need for a modular drive assembly that can be used in either the elevation or azimuth orientation.

Typical drive assemblies are gear driven. The metal-to-metal contact of gear teeth requires lubrication around the area of the teeth. In some types of gear housing, such as helicopter gear boxes, the lubricant occupies a considerable volume of space within the housing, yet is needed only in the area of the gear teeth and related bearings. The excess lubricant adds weight to the assembly and requires more lubricant than necessary to properly operate the assembly. The problem of excess lubricant has been partially solved by the use of inserts placed within the gear housing. The insert occupies space otherwise occupies by the lubricant, and is usually lightweight and inexpensive. Minimizing the clearance around the gear meshes and bearing surface maintains lubricant contact with the surfaces needing lubrication.

There are, however, problems remain with existing inserts. First, the insert material eventually tends to absorb the lubricant, thus, defeating the purpose for having an insert by increasing lubricant usage and increasing the weight of the insert. Second, some gear assemblies may be comprised of optional, interchangeable pieces of equipment which occupy space within the gear housing only when present. For exaple, a drive assembly may be designed to house two motor units and two data packages that are easily removeable when not in use. Inserts that have open areas to accommodate unused optional equipment require more lubricant to fill the open areas. Therefore, a need exists for a system capable of accommodating optional equipment which extends into the gear housing without significantly increasing the open space within the housing filled by lubricant.

SUMMARY OF THE INVENTION

The present invention relates to a lubricant filled drive assembly having an insert to displace the volume of lubricant. The insert is shaped so as to receive interchangeable pieces of drive assembly equipment, and when certain pieces of equipment are not used, plugs are added to the assembly to occupy the empty space within the insert. By eliminating any unoccupied space, the plugs alleviate the need for additional lubricant which might otherwise be unnecessary. In addition, the lubricant might collect in this void and not be present where it is needed, at the gear meshess and the bearing race.

Generally described, the present invention provides a lubricant filled housing, comprising a volume of lubricant contained within the housing, a plurality of openings in the housing, at least one member extending into the housing and through one of the openings to the exterior of the housing, an insert shaped to occupy space within the housing so as to reduce the volume of lubricant, and and at least one plug. The insert defines a plurality of recesses positioned opposite the openings, the member extends into one of the recesses, and the plug is shaped to be received by at least one of the recesses not occupied by the member, and to close the one of the openings opposite the recess filled by the plug.

In its preferred embodiment, the drive assembly includes a base plate, a bull gear, a ball bearing, a bearing retainer and a turntable. The turntable is attached to the inner race of the bearing which allows it to freely rotate. Attached to the bottom of the base plate are a gear-assembly motor and data packages and various plugs shaped to fit the recesses in the insert not occupied by a gear motor assembly or data package.

A series of openings are provided on the base plate through which portions of the plugs, motor gear-assembly, and data packages pass. The gear motor assembly has a pinion that engages with the teeth of the bull gear to drive the assembly. The data package has a follower that provides an accurate measure of the assembly's position. The plugs are inserted into either a data package space or a motor package space when less than all the openings are occupied by equipment. The plug is placed in the void within the insert further displacing the volume of lubricant required to fill the housing of the drive assembly.

Both the insert and plugs are preferably formed of a foam, and may be covered with a lubricant impermeable coating to prohibit the material from absorbing the lubricant. The coating may be urethane or an epoxy.

The present invention is not limited to application on antenna mounting structures, but may have many other uses. Furthermore, orientation of the various assembly parts may be altered.

Thus, it is an object of the present invention to provide a novel and improved modular drive assembly.

It is a further object of the present invention to provide an insert in the drive assembly that occupies space otherwise occupied by lubricant, thus, decreasing the required amount of lubricant.

It is a further object of the present invention to provide a lightweight inexpensive insert drive assembly that decreases the overall assembly weight and cost.

It is a further object of the present invention to provide for removable plugs of various shapes that occupy space provided in the insert otherwise occupied by interchangeable or optional pieces of assembly equipment.

It is a further object of the present invention to provide a layer of material to be applied over the entire surface of the plugs and insert so as to inhibit absorption of the lubricant.

Other objects, features, and advantages of the present invention will become apparent upon reading the following detailed description of embodiments of the invention, when taken in conjunction with the drawings and appended claims.

BRIEF DESCRIPTION OF THE DRAWINGS

The invention will now be described with reference to the accompanying drawings, which illustrate a preferred embodiment of the drive module assembly of the present invention falling within the scope of the appended claims, and in which:

FIGS. 6A-6D shows top and side views of the different shaped plugs.

FIGS. 7A and 7B are top and cross-sectional views of the insert.

FIG. 8 is a magnified cross-sectional view of the bearing.

DETAILED DESCRIPTION

Figure 1:
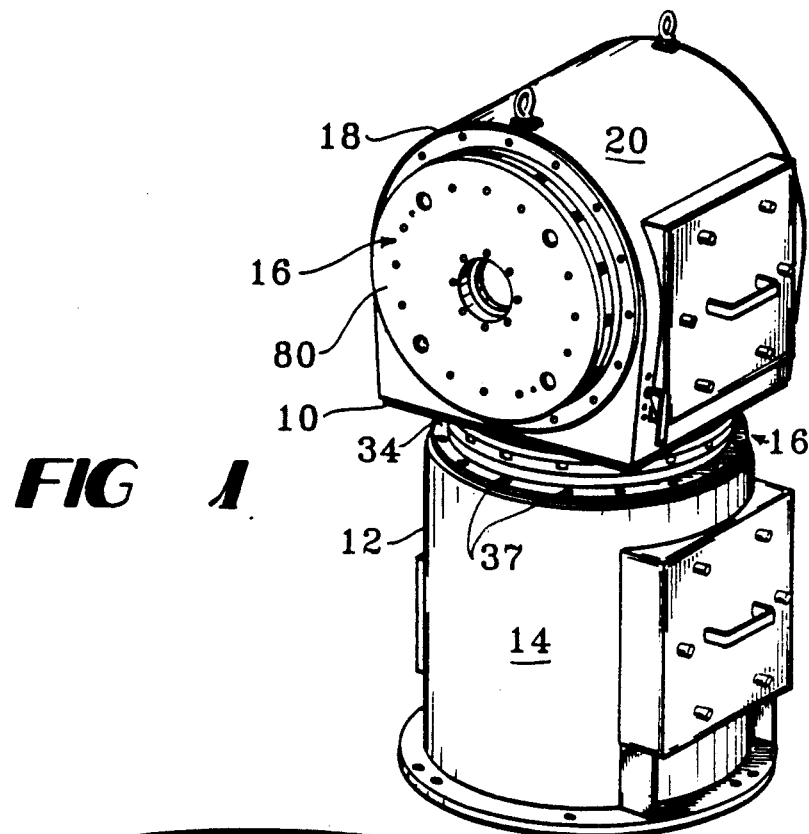
FIG. 1 is a pictorial view of a pedestal assembly embodying the invention, showing the azimuth and elevation housings.
Figure 2:
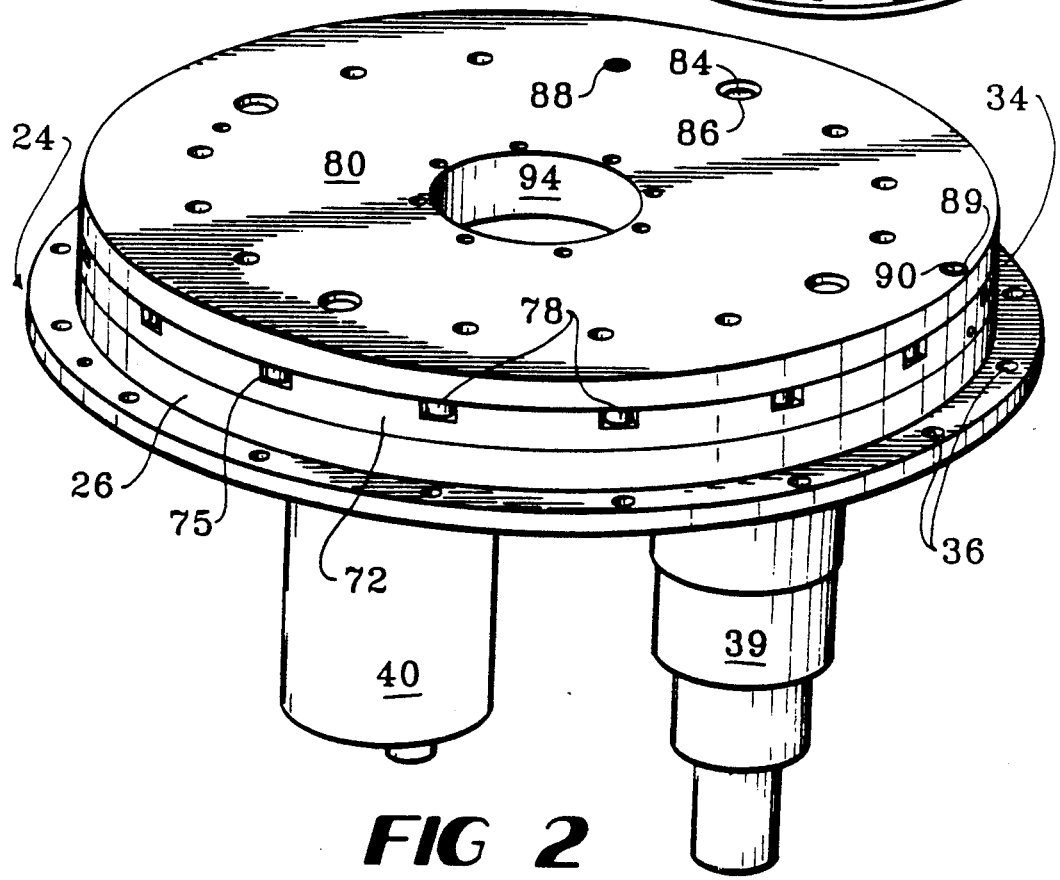
FIG. 2 is a pictorial view of the drive module assembly utilized in the pedestal assembly of FIG. 1.

Referring now in more detail to the drawing, in which like numerals refer to like parts throughout the several views, FIG. 1 shows a pedestal assembly 10 which includes an azimuth housing assembly 12 having an azimuth housing 14 and a drive module 16, shown in more detail in FIG. 2. Secured to the first drive module 16 is an elevation housing assembly 18 comprised of an elevation housing 20 and a second, identical drive module 16.

Figure 3:
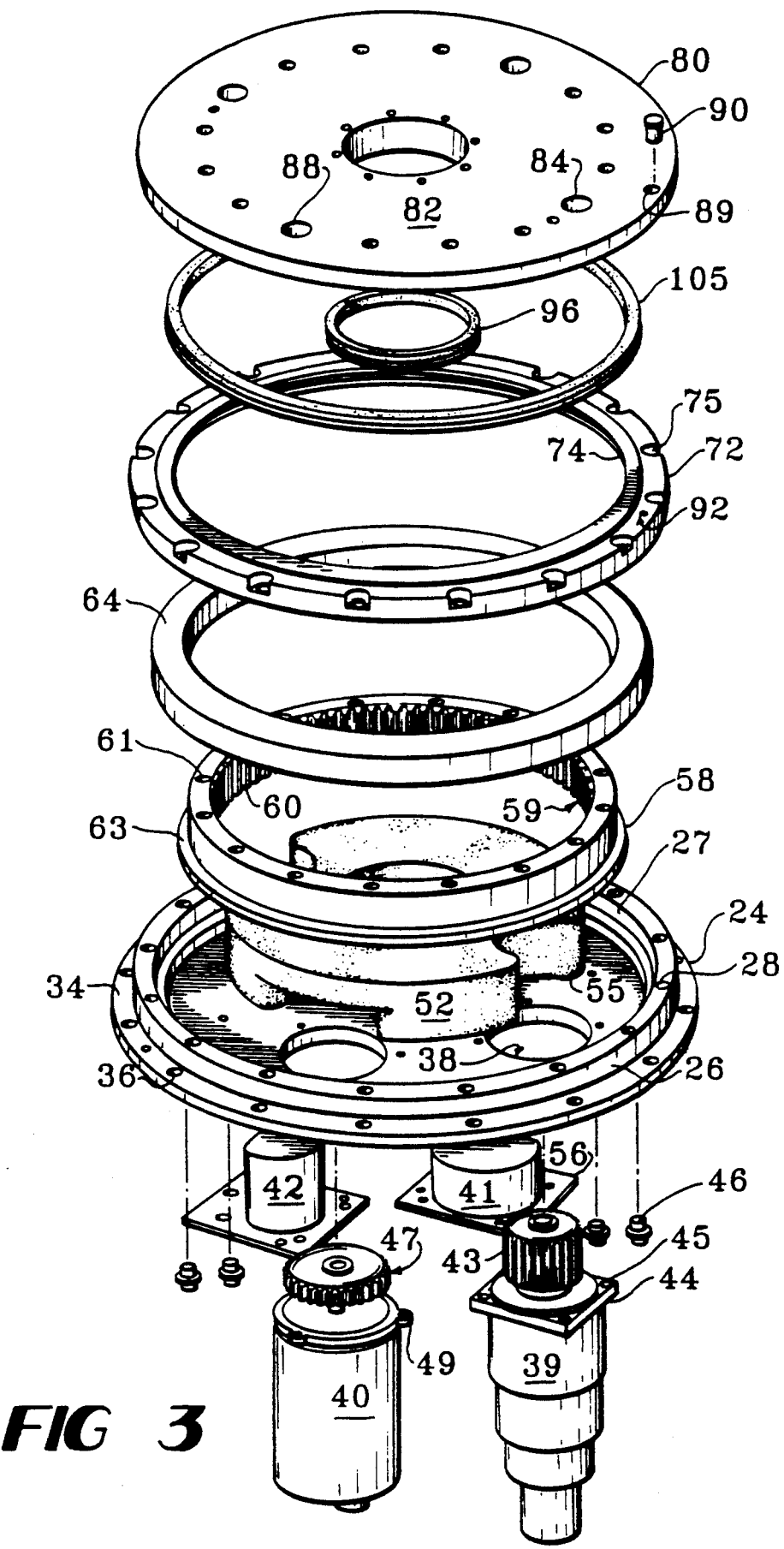
FIG. 3 is an exploded view of the assembled parts comprising the drive module assembly of FIG. 2.

Referring now to FIG. 3, the drive module 16 is comprised of a base plate 24 having an upwardly extending annular member 26. The base plate 24 is preferably formed of aluminum. The inner surface of the annular member 26 is stepped so as to form an inner seat 27. A plurality of holes 28 are tapped into the upper surface of the annular member 26 to secure other parts of the drive module 16.

Figure 4:
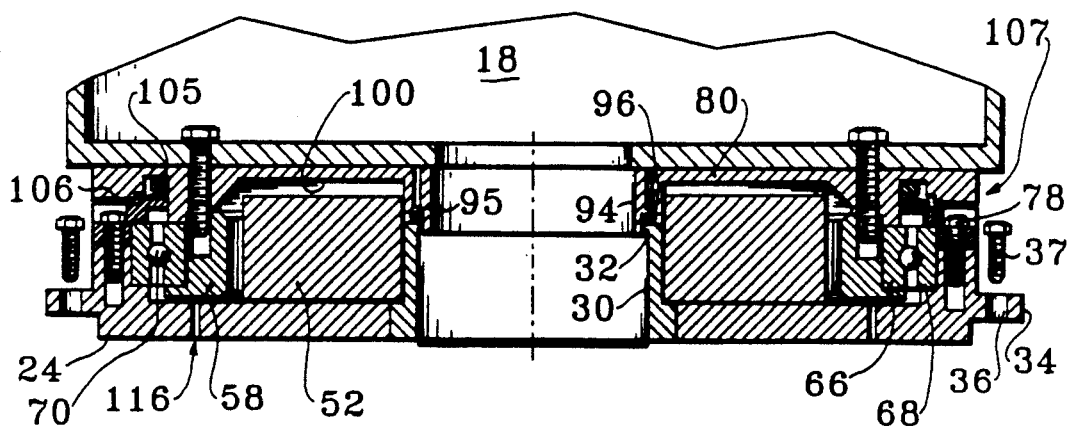
FIG. 4 is a cross-section of a loaded drive module assembly taken along line 4—4 of FIG. 5.
Figure 5:
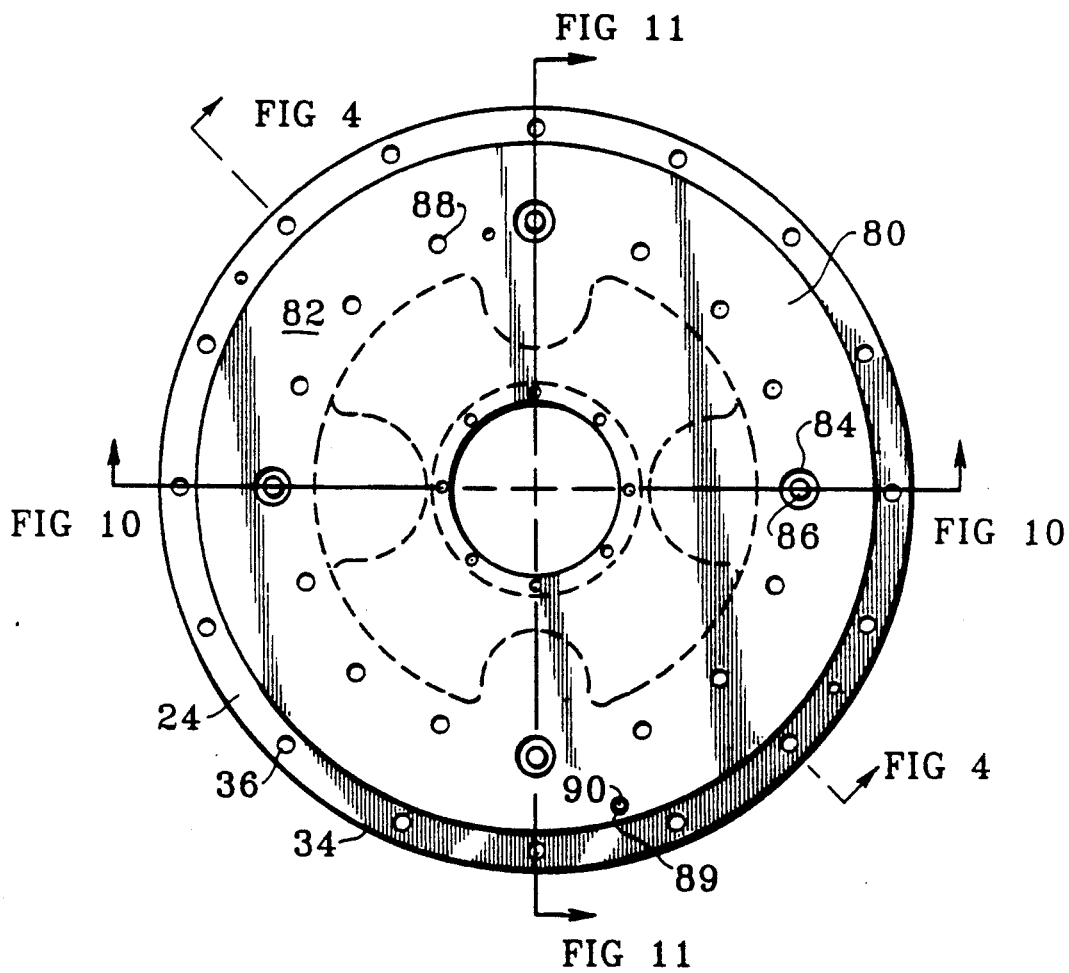
FIG. 5 is a top plan view of the drive module assembly.
Figure 9:
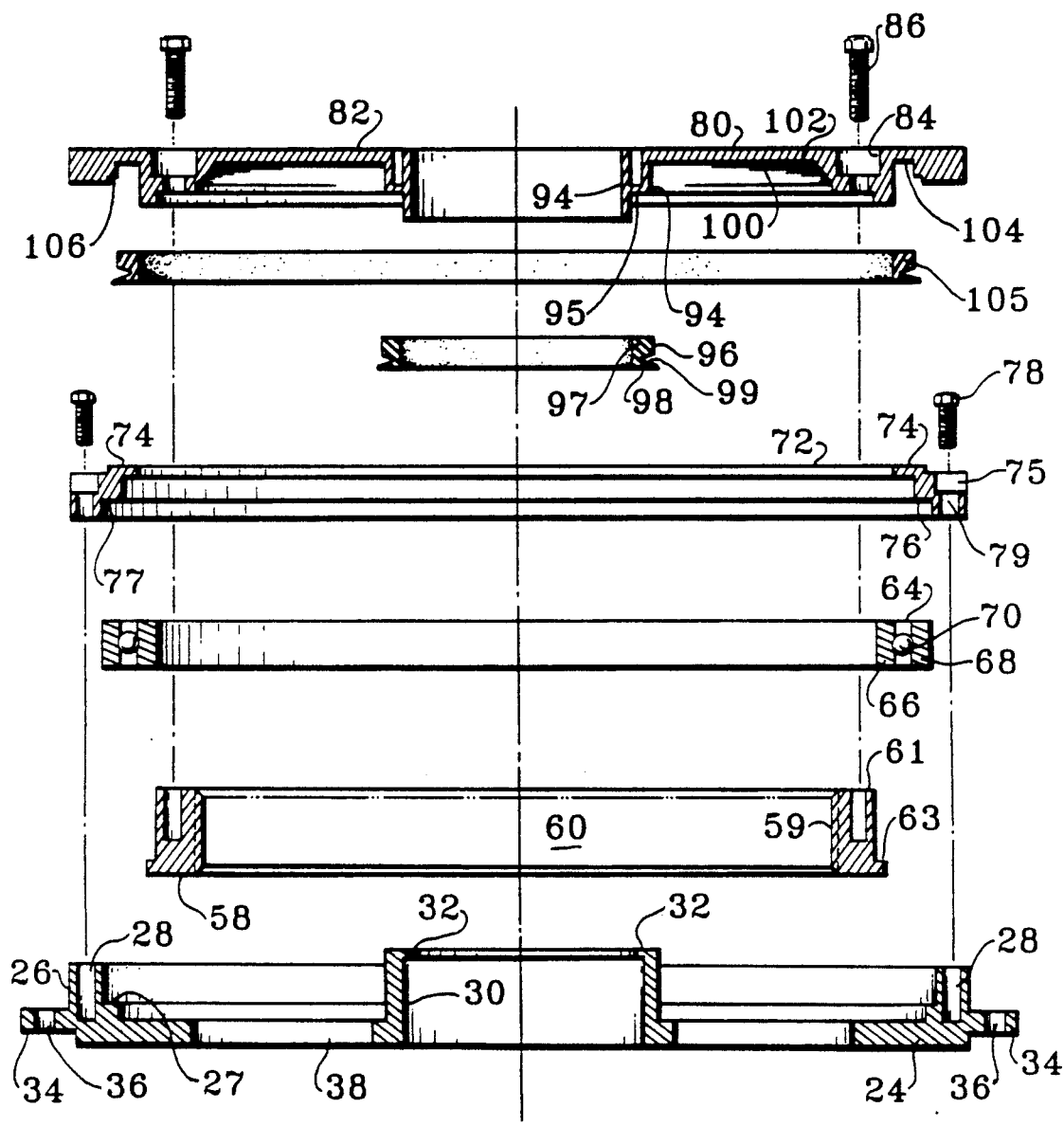
FIG. 9 is an exploded cross-sectional view of the drive module assembly.
Figure 10:
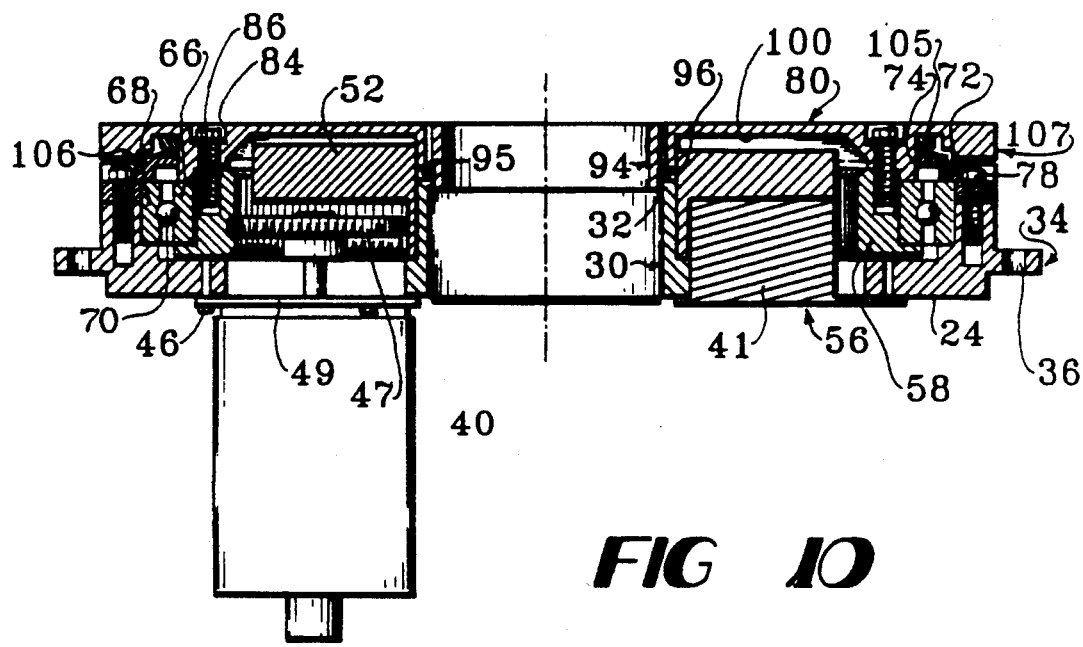
FIG. 10 is a cross-sectional view of the drive module assembly showing the insertion of the data package, taken along line 10—10 of FIG. 5.
Figure 11:
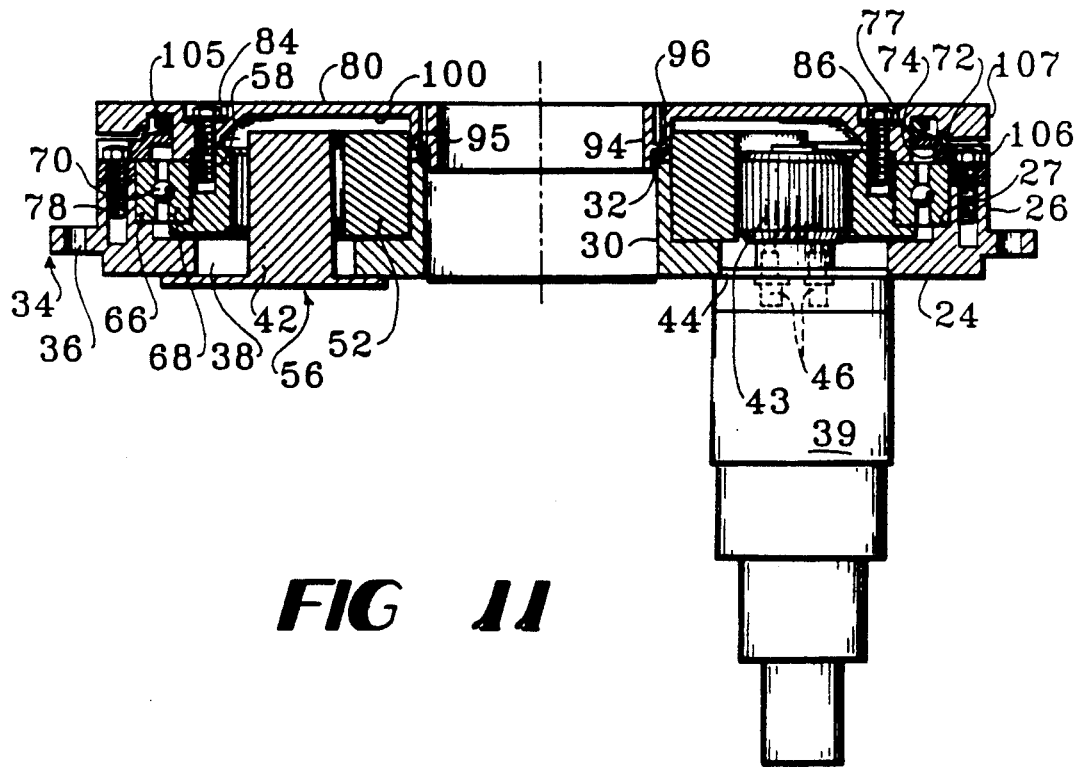
FIG. 11 is a cross-sectional view of the drive module assembly showing the insertion of the gear motor assembly, taken along line 11—11 of FIG. 5.

The base plate 24 also defines a cylindrical inner sleeve 30, shown in more detail in FIGS. 4, 9, and 10, having an inwardly extending lip 32 at the upper surface of the inner sleeve. The base plate also has an outer rim 34 extending around the outer circumference of the plate. Evenly spaced along the rim are bored holes 36 which receive mounting bolts 37 that fasten the base plate to the housing, as shown in FIGS. 1, 4 and 5.

Through the base plate between the annular member 26 and the sleeve 30 a plurality of circular openings 38 are formed. The openings are designed to receive a gear motor assembly 39, a data package 40, or plugs 41 and 42, described in detail below. The gear motor assembly 39 includes a pinion 43 that is used to drive the modular drive assembly 16. It is the pinion 43 that extends through one of the openings 38 of the base plate 24. The motor 39 is fastened to the lower surface of the base plate 24 by means of an integral mounting flange 44 having through holes 45. Bolts 46 fasten the plate to the base plate.

The pinion 43 may be split to form two pinions and spring loaded to provide tension in the pinion and gear interface. The tension eliminates backlash in the rotation of the assembly and helps to achieve greater accuracy of the positioning of the bull gear.

The data package 40 is a conventional device for monitoring the rotary position of drive assembly 16. In the data package 40, a toothed, rotary follower 47 extends through the base plate 24 and is designed to permit an accurate read-out of the position of the drive module. A retaining ring 49 is attached to the outer circumference of the data package and bolted with bolts 46 to the lower surface of the base plate 24. Clasps (not shown) may be used instead of a retaining ring to secure the data package 40 to the base plate 24.

Preferably, at least four openings 38 are provided in the base plate 24, so that dual sets gear motor assemblies 39 and data packages 40 can be provided, primarily when more drive force is needed to rotate a load mounted on the drive module 16. In the openings not occupied by either a motor 39 or data package 40, plugs 41 or 42 are inserted, as shown in FIGS. 4 and 10 and described in detail below. Thus, at any of the four openings 38, a member such as a data package 40, motor 39, or plug 41, 42, may extend into the housing.

The base plate 24, retainer ring 72 and turntable 80 form an annular container for lubricant within the central area of the drive module. An insert 52, shown in more detail in FIGS. 7A and 7B is located with such container within the central portion of the drive module assembly. The insert sits on the upper surface of the base plate 24. The insert 52 is a preshaped structure, preferably made of an isocyanate-polyurethane foam for weight minimization, and generally has the shape of a cloverleaf, having four semicircular cutout sections 53 and 54 and a central opening 50. The two sections 53 extend through the entire thickness of the insert 52, while the other two sections 54 extend only partially through from the bottom surface of the insert 52. The cutout sections 53 and 54 have rounded edges 55 so as to inhibit breakage of the corners upon insertion of a motor or data package or plug, or upon stress caused by the circulation of lubricant within the drive module.

The plugs 41 and 42 are also preferably made of an isocyanate-polyurethane foam. They differ in shape, the plug 41 being designed to substitute for a data package, and the plug 42 being designed to substitute for a motor. The plugs are shown in more detail in FIGS. 6A through 6D. The plugs 41 and 42 are fillers and are designed to occupy space otherwise occupied by the lubricant in the central area of the drive module assembly. The plugs 41 and 42 conform to recesses 53 and 54, respectively, in an insert 52. Each plug is attached to a mounting plate 56, preferably by means of an adhesive, and are bolted to the lower surface of the base plate by means of threaded bolts 46.

The insert 52 and the plugs 41 and 42 are preferably coated with a lubricant-impermeable coating layer.

Suitable coating materials include urethane, such as Jaxsan 600, manufactured by Plastic Coating of Charleston, W. Va., or epoxy. The coating layer prevents penetration of grease into the foam, thereby maximizing the amount of lubricant displaced, and preventing the insert material from increasing in weight.

The insert 52 is surrounded by a bull gear 58. The teeth of the gear 59 are located along its interior surface 60. The upper surface of the bull gear contains equally-spaced tapped holes 61 designed to receive bolts 86 that help to distribute the load to the bull gear 58. Extending from the outer circumference of the bull gear 58 is an outer lip 63. The outer lip 63 is the lower seat for a ball bearing 64. The ball bearing 64 has an inner race 66, an outer race 68, and balls 70. The structure of the ball bearing is shown in more detail in FIG. 8. The bearing surfaces in contact with the balls are shaped in upper and lower Gothic arch curves. This particular shape enables each ball to contact the race surfaces at four points. This enables the load to be more evenly distributed and eliminates radial pressure when the inner race of the bearing tilts, as described below, upon contraction of the base plate 24 at colder ambient temperatures.

The bearing 64 is held in place on its upper outer race by a retainer ring 72. The retainer ring 72 and bearing 64 are preferably made of stainless steel or other material having a lower coefficient of thermal expansion than the base plate 24, and has a particular shape shown in more detail in FIGS. 9 and 10. A retainer body 76 defines an annular notch 77 shaped to conform to the outer race 68 of the bearing 64. The notch 77 acts as an upper bearing seat. A raised inner lip 74 extends horizontally from the body 76 of the retainer ring. The inner lip 74 defines with the body 76 a stepped profile along the upper surface of the retainer ring 72. More particularly, the body 76 has a horizontal upper surface, and the inner lip has a horizontal surface that is one vertical step above the body 76. The retainer ring 72 is secured to the base plate 24 by means of retainer bolts 78 placed through holes 79 and threaded into corresponding tapped holes 28 in the base plate 24. The holes 79 are counterbored to form recesses 75 so that the bolts 78 clear the upper surface of the body 76 to allow for free movement of parts of the drive module assembly. Furthermore, the outer area of the recesses 76 is open to the exterior of the retainer ring 72 to allow for water runoff to help prevent corrosion of the retainer ring.

Located above the retainer ring 72 is a turntable 80. The turntable 80 is directly attached to the bull gear 58. This allows the turntable 80 to rotate freely about the central axis of the drive module 16. The turntable 80 has a flat upper surface 82 on which turntable counterbored holes 84 are located. The turntable counterbored holes 84 receive turntable mounting bolts 86 that thread into the bull gear 58. Also located along the upper horizontal surface of the turntable 80 are a series of circularly located through holes 88. These holes are aligned with the bull gear tapped holes 61 so as to allow an attached load to be directly attached to and borne by the bull gear 58, as best shown in FIG. 4. The load may be, for example, the elevation housing 20 attached to the azimuth drive module, as shown in FIG. 1, or an antenna reflector mounting assembly (not shown). Along the edge of the turntable upper surface 80 is a locking pin hole 89. The turntable 80 is capable of being locked in place by the insertion of a locking pin 90 into the locking hole 89 on the turntable 80 and through to a corresponding hole 92 located along the upper surface of the retainer ring 72.

Extending downwardly along the inner circumference of the turntable 80 is an elongated inner sleeve 94. A step is provided adjacent to the outer surface of the inner sleeve 94 to act as a seat 95 for an inner v-ring gasket 96. The conventional v-ring 96 is made of elastomer and comprises a body 97 and a conical lip 98 which is joined to the body by a resilient hinge 99 located at the base of the "V" shape. The v-ring is seated on the outer surface of the elongated sleeve 94 of the turntable 80 and the lip 98 slidingly engages the top surface of sleeve 30 of the base plate 24 to seal the drive module from the ingress of liquid or dust and the escape of lubricant.

Located below the flat upper surface 82 of the turntable 80 and extending radially outwardly from the inner v-ring seat 95 is a lower flat surface 100. The outer annular edge 102 of the lower flat surface 100 is beveled downwardly. This provides for a greater cross-sectional area for the counterbored holes 84.

Beyond the counterbored holes 84 on the lower surface of the turntable 80 is an annular groove 104. A second, outer v-ring gasket 105 is mounted in the groove 104. The lip of the outer v-ring creates a seal against the upper surface of the inner lip 74 of the retainer ring 72 to prevent the escape of lubricant.

A lower, outer turntable surface 106 is located between the outer v-ring groove 104 and the periphery 107 of the turntable 80. The surface 106 is stepped in shape and designed to precisely mate with the upper surface of the retainer ring 72, which is spaced a short distance from the surface 106. Furthermore, the profile of this lower, outer surface 106, along with the mating stepped profile of the body 76 and the horizontal inner lip 74 of the retainer ring 72, create a labyrinth which provides an (Radio Frequency Interference/Electromagnetic Interference) shield as well as a shield against entry of liquid and dust. Radiation is discouraged from entry by the tortuous path it must follow through the gap between the stepped profiles to reach the interior of the drive module 16. This gap is preferably 0.03 inch wide along both the horizontal and vertical sections thereof. The gap should be sized to accommodate tilting movement of the bearing race 68.

It will be seen that the two inner sleeves 30 and 94 move closely adjacent to one another, with the lip 32 extending to within a short distance from the inner sleeve 94 of the turntable 80. This construction provides a second labyrinth against the entry of RFI/EMI. The cylindrical space inside the elongated inner sleeve 94 of the turntable 80 and the base plate inner sleeve 30 passes completely through the drive module 16 and is designed for housing electrical cables and wiring both for operating the second drive module positioned within the elevation housing 20 and for operating the electronics of an antenna mounted on the pedestal 10. When the drive module is positioned to provide an elevation axis, the opening formed by the sleeves can receive an axle associated with an antenna reflector, and the elevation housing 20 can optionally be provided with an idler bearing (not shown) opposite the drive module.

The base plate 24 has at least one opening 110 to which a nipple may be attached for providing lubricant to the interior of the drive module 16. Drain plugs (not shown) are also provided to allow old or excess lubricant to flow out of the assembly.

The drive module 16 can be assembled by fitting the inner and outer v-ring gaskets 96 and 105 into seat 95 and groove 104, respectively of the turntable 80. With the bull gear 58 loosely positioned on the base plate, the bearing 64 can then be seated on the base plate 24 and bull gear 58. The retainer ring 72 is then secured to the base plate 24 with bolts 78, clamping the outer bearing race in place. The insert 52 is then placed inside the bull gear 58. The turntable 80 is then placed over the insert 58 and secured to the bull gear 58 by bolts 86, clamping the inner bearing race in place. The gear motor assembly 39, data package 40, and plugs 41 and 42 are inserted from the bottom surface of the base plate 24, and secured to the base plate 24 with bolts 46.

Lubricant, preferably grease, is then introduced into the interior of the drive module 16 through opening 110 in the base plate 24.

The drive module 16 may then be mounted to the azimuth housing 14 with bolts 37 passing through holes 36 in the rim 34. The elevation housing 20 may then be attached to the turntable 80 by means of bolts 86, and a second drive module may be mounted in the elevation housing for rotation about a horizontal axis if desired, as shown in FIG. 1.

When power is provided to the gear motor assembly 39, the pinion 43 drives the teeth 59 of the bull gear 58, causing the bull gear 58 and turntable 80 to rotate, which rotates the load. The follower 47 on the data package 40 monitors the position of the bull gear 58.

As the turntable 80 rotates, the profile of its lower outer surface 106 rotates with respect to the upper surface of the retaining ring 72, and the stepped gap between the two surfaces is constantly maintained. This stepped gap, or labyrinth, shields against electromagnetic radiation as well as water and dirt.

If only one motor and data package are utilized, the plugs 41 and 42 are secured within the drive module 16, and the displacement of lubricant is maximized.

When the aluminum base plate 24 is exposed to low temperatures, it contracts considerably more than the outer bearing race 68 or retainer ring 72. This contraction causes the outer race 68 to tilt (i.e., the bottom portion of the race is forced inwardly). The base plate 24, bearing 64 and retainer 72 of the present invention are specifically dimensioned to allow the outer race 68 to pivot about the ball 70 in response to the unbalanced force, represented by an arrow 120 in FIG. 8. This causes the inward force to travel across the ball of the ball bearing along a predesigned path, represented by an arrow 125 in FIG. 8, and to be distributed optimally on the inner race 66. The distribution of this inward force passes through the same locations on the ball through which the force of the load passes, so that no additional portions of the ball are pinched by the contraction of the base plate. The path of the load force through the bearing is indicated by an arrow 126.

With reference to FIG. 4, the elevation housing 20 is mounted on top of the turntable 80 and its weight is borne directly by the bull gear 58. This efficient method of load distribution enables the drive module 16 to be smaller in size and lighter in weight than previous designs.

It should be noted that relative terms such as "upper," "lower," "horizontal," "vertical," and the like are used as a matter of convenience to define an internal frame of reference within the drive module, and are not intended to limit the orientation in which the invention may be utilized.

It will be appreciated that the embodiments discussed above are preferred embodiments, falling within the scope of the appended claims, and that various alternative embodiments are contemplated, including orienting the retainer and base plate differently, substituting different materials for the foam insert, and using different materials for the base plate 24, bearing 64, and retainer ring 72 having different coefficients of thermal expansion as described above.

I claim:

1. An insert shaped to occupy space in a lubricant-filled container so as to reduce the volume of lubricant comprising:
   a preshaped isocyanate polyurethane foam structure; and
   a coating of lubricant impregnable urethane over the surface of said structure.

2. A gear housing, comprising:
   a volume of lubricant contained within said housing;
   an isocyanate polyurethane foam insert shaped to occupy space within said housing so as to reduce said volume of lubricant;
   the surface of said insert being coated with a urethane lubricant impermeable layer.

3. A lubricant filled housing, comprising:
   a volume of lubricant contained within said housing;
   a plurality of openings in said housing;
   at least one member extending into said housing and through one of said openings to the exterior of said housing;
   an insert shaped to occupy space within said housing so as to reduce said volume of lubricant, said insert defining a plurality of recesses positioned opposite said openings;
   said member extending into one of said recesses; and
   at least one plug shaped to be received by at least one of said recesses not occupied by said member, and to close the one of said openings opposite said recess filled by said plug.

4. A gear housing, comprising:
   a first gear;
   at least one second gear engaging said first gear;
   a volume of lubricant contained within said housing;
   a plurality of openings in said housing;
   a connecting member operatively associated with said second gear and extending through one of said openings to the exterior of said housing;
   an insert shaped to occupy space within said housing so as to reduce said volume of lubricant, said insert defining a plurality of recesses positioned opposite said openings;
   said second gear being positioned within one of said recesses; and
   at least one plug shaped to be received by at least one of said recesses not occupied by said second gear, and to close the one of said openings opposite said recess filled by said plug.

5. The apparatus of claim 4 wherein said insert is shaped like a cloverleaf.

6. The apparatus of claim 4 wherein said plug comprises:
   a filler shaped to occupy said recess not occupied by said second gear; and
   a plate shaped to close one of said openings, said filler being attached to said plate by means of an adhesive.

7. The apparatus of claim 4 wherein said plug comprises:

a filler shaped to occupy said recess not occupied by said second gear; and a rim, integral with said filler, shaped to close one of said openings opposite said recesses.

8. The apparatus of claim 4 wherein said plug comprises foam.

9. The apparatus of claim 8 wherein said foam comprises isocyanate-polyurethane.

10. The apparatus of claim 8 wherein said plug is coated with a lubricant impregnable material.

11. The apparatus of claim 10 wherein said coating material is urethane.

* * * * *